No. 622,022. Patented Mar. 28, 1899.
E. SCHLIESEWSKY.
SHAVINGS MACHINE.
(Application filed Sept. 27, 1897.)
(No Model.) 6 Sheets—Sheet 1.

Witnesses
W. C. Corlies
C. H. Crawford

Inventor
Edward Schliesewsky
By Rudolph Wm. Lotz
Atty

Fig. 2.

No. 622,022. Patented Mar. 28, 1899.
E. SCHLIESEWSKY.
SHAVINGS MACHINE.
(Application filed Sept. 27, 1897.)
(No Model.) 6 Sheets—Sheet 5.

Witnesses
W. C. Coolies
C. H. Crawford

Inventor
Eduard Schliesewsky
By Rudolph M. Loz
Atty

United States Patent Office.

EDUARD SCHLIESEWSKY, OF CHICAGO, ILLINOIS, ASSIGNOR, BY MESNE ASSIGNMENTS, TO OTTO H. REDLICH, JR., AND RUDOLPH REDLICH, OF SAME PLACE.

SHAVINGS-MACHINE.

SPECIFICATION forming part of Letters Patent No. 622,022, dated March 28, 1899.

Application filed September 27, 1897. Serial No. 653,107. (No model.)

*To all whom it may concern:*

Be it known that I, EDUARD SCHLIESEWSKY, a subject of the Emperor of Germany, residing at Chicago, in the county of Cook and State of Illinois, have invented certain new and useful Improvements in Shavings-Machines; and I do hereby declare the following to be a full, clear, and exact description of the invention, such as will enable others skilled in the art to which it appertains to make and use the same.

My invention relates to a novel construction in a machine for cutting brewers' shavings used for clarifying beer and other liquids, the object being to provide a machine of this description which can be regulated to cut a shaving of any desired thickness, straighten the same, and deliver it to a bunching device or chute, from which the shavings are taken and packed in bales; and it consists in the features of construction and combinations of parts hereinafter fully described and claimed.

In the accompanying drawings, illustrating my invention.

Referring now to said drawings, A indicates two uprights upon which the machine is supported. The said uprights A carry guides 1 on their rear faces, in which a vertically-reciprocating plunger 2 moves, which carries the knife 3. Said plunger 2 is operated by means of a pitman 4, connected with a crank-shaft at the upper end of the machine, which I have not shown.

Mounted upon the guides 1 are feeding devices 5, which are adapted to feed the block 6 of wood so as to cause the knife 3 to cut a shaving of the desired thickness therefrom at every stroke. The said feeding devices are operated from a moving part of the machine; but as the detail construction thereof forms no part of my invention I have omitted to show the same more fully. Said plunger 2 is slotted between its ends, and in said slotted portion said knife 3 is mounted. Mounted upon said plunger is a guide-plate 7, which extends outwardly from the upper end thereof and thence downwardly at an incline, so that its lower edge, which is sharpened, rests against the beveled portion of knife 3 immediately above the cutting edge of the same. The said guide-plate 7 forms a part of the shavings-straightening device, and to this end is bent to an outwardly-projecting curve 8 adjacent its lower edge.

In cutting a thin shaving the same always curls up, the extent of such curling being dependent upon the thickness of the shaving and the angle of the beveled edge of the knife. For clarifying beer it is desirable that the shaving should be as straight as possible, and to this end I have provided a simple and efficient device coacting with said guide-plate 7, which delivers the shaving from the machine perfectly straight.

It is well known that a piece of paper which has been rolled can be straightened by passing the convex side thereof over a sharp edge or a very small roller, thereby neutralizing the tendency of the fiber to curl in the direction in which it was trained when the the paper was curled. This principle I have applied in my machine, and to this end provide a pair of antifriction-rollers 9, set so that the shaving as it is cut passes over the lowermost roller 9, thence over the portion 8 of the guide-plate 7, and thence over the uppermost roller 9. In this manner the shaving is bent over in a direction opposite to that in which the beveled edge of the knife bends it, and thus its tendency to curl is immediately neutralized and the shaving straightened. The said rollers 9 are journaled in the flanges 10 of a block 11, which fits between said rollers and is provided with a concave face adapted to coact with the convex portion 8 of the plate 7 to guide the shaving and prevent same from passing underneath the uppermost roller 9. Said block 11 is provided on its outer face midway between its ends with an outwardly-extending arm 12, which is provided with a segmental slot 13 in one portion, which is adapted to receive a bolt 14, by means of which it is held rigidly in engagement with the upper end of an arm 15, pivotally mounted between lugs 16 on a plate 16ª, mounted upon the lower end of said plunger 2. A bolt 17, passing through the middle portion of said arm 15 and through the portion 18 of the arm 12, serves as a pivot for said arm. Pivoted at one end upon said bolt 14 is a link 19, which at its other end is pivotally connected with the end of a spiral spring 20, trained around a shaft 21, journaled in lugs 22 on said plate 16ª. Said shaft 21 carries a worm-wheel 23 at one end, which intermeshes with a worm 24, journaled in a flange on one of said lugs 22 and in said plate 16ª. Said spring 20 at its other end enters an opening in said shaft 21, and the tension thereof is adjusted by means of said worm-wheel and worm, as will be obvious. The tension of the spring must obviously be increased in proportion to the increase in thickness of the shaving, and vice versa. By means of the segmental slot 13 the said rollers 9 can be adjusted so as to press equally upon the shaving, as will be obvious.

Figure 17:
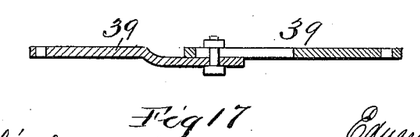
Fig. 17 is a detail sectional view on the line 17 17 of Fig. 12.

The shaving after being cut and straightened follows the guide-plate 7 and in its upward passage is engaged by a spring-actuated plate 25, pivotally mounted upon a lug 26 on said plunger 2. Said shaving passes between said plate 7 and plate 25 and is held by said plate 25 to prevent it from falling and to enable it to be carried upward with the plunger. Said shaving projects upwardly beyond the said plate 7, and this projecting end is adapted to be grasped between the jaws of a carrier by means of which the shaving is transferred to the bunching device. Mounted upon one of said uprights A is a casting 27, carrying an outwardly and upwardly extending arm 28, to which a bell-crank lever 29 is pivoted, which is connected with the plunger 2 by means of a link 30 and at its other end is connected by means of a link 31 with the shaft 32 of a pair of clamping-jaws 33, which are adapted to receive the shaving and carry same to the bunching device. Said jaws 33 are pivoted upon said shaft 32 in the manner of the leaves of a hinge—that is, one of said jaws is provided with a recess between the bearings, and the bearings of the other leaf fit within said recess between the bearings of the first-named leaf. In my device I employ a jaw $a$, which extends downwardly from the shaft 32 and is provided with eyes 34, adjacent its side edges, through which the shaft 32 is adapted to extend, and on its inner face with pivot-lugs 35, between which the outer end of a link 36 is adapted to be pivoted. The jaw $b$ is adapted to project above the shaft 32, as well as below, and is provided with eyes 37, adapted to fit between said eyes 34 and to receive said shaft 32. At its upper end said jaw $b$ is provided with pivot-lugs 38, between which the outer end of a link 39 is adapted to be pivoted. Said jaw $b$ is further provided on its downwardly-extending portion with an opening 40, through which the link 36 is adapted to pass. A spring 41, trained around said shaft 32 and situated in a recess 42 in said jaw $b$, is adapted to hold said jaws normally spread apart to receive the shaving. On the lower ends of the inner faces of one or both of said jaws I secure a yielding cushion of rubber or the like, which enables the jaws to grasp the shaving more firmly than the metal faces would permit. Said link 39 is made adjustable, as shown in Fig. 17, in an obvious manner and for obvious reasons.

Figures 1, 18, 19, 20:
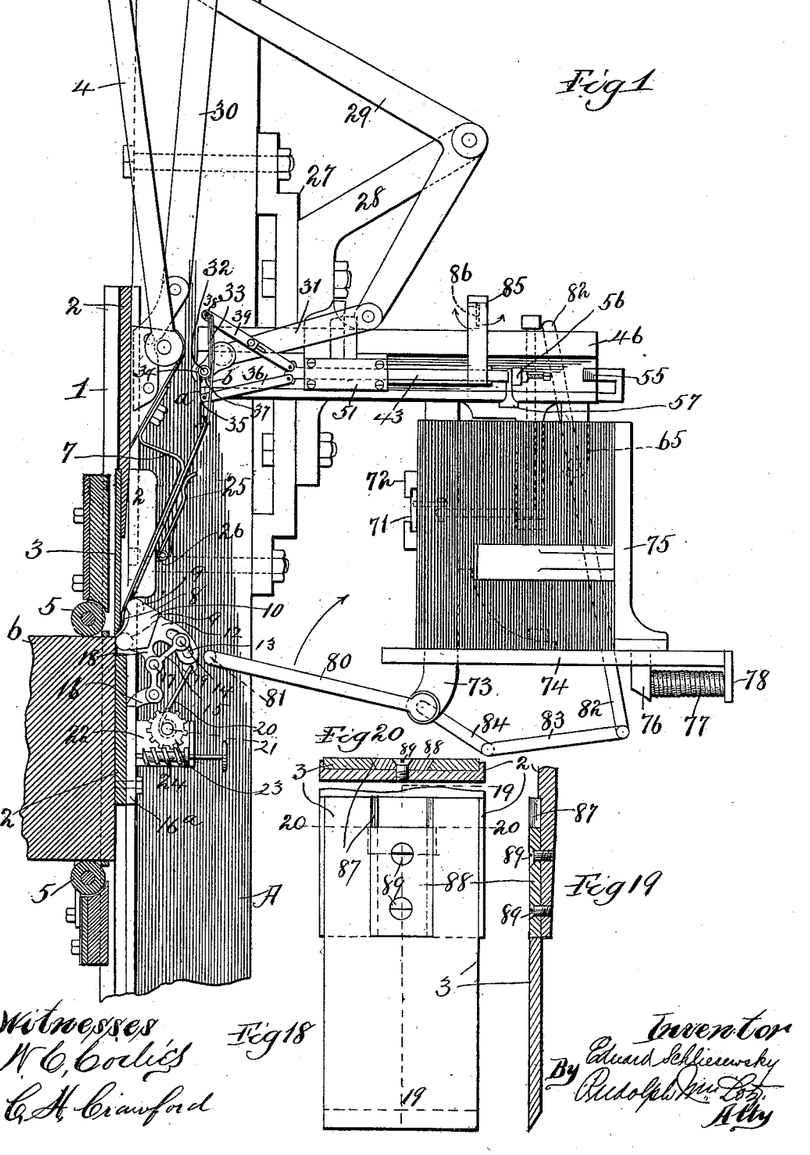
Figure 1 is a side elevation, partially in section, of a machine constructed in accordance with my invention.
Fig. 18 is a view in elevation of the cutting-knife I employ.
Fig. 19 is a sectional view of the same, taken on line 19 19 of Fig. 18.
Fig. 20 is a sectional view of same, taken on line 20 20 of Fig. 18.
Figure 2:
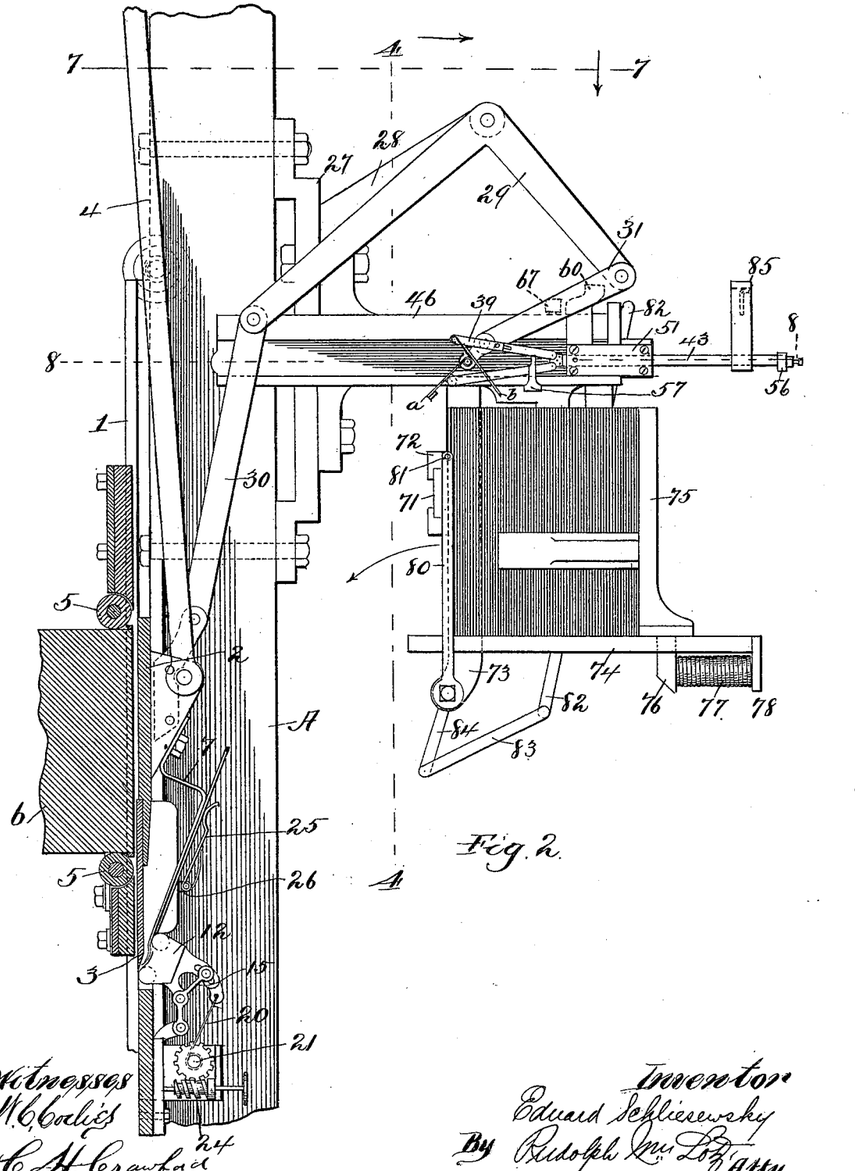
Fig. 2 is a similar view showing the knife and other parts of the machine at opposite limits of their movement from those shown in Fig. 1.
Figures 3, 4, 5, 6:
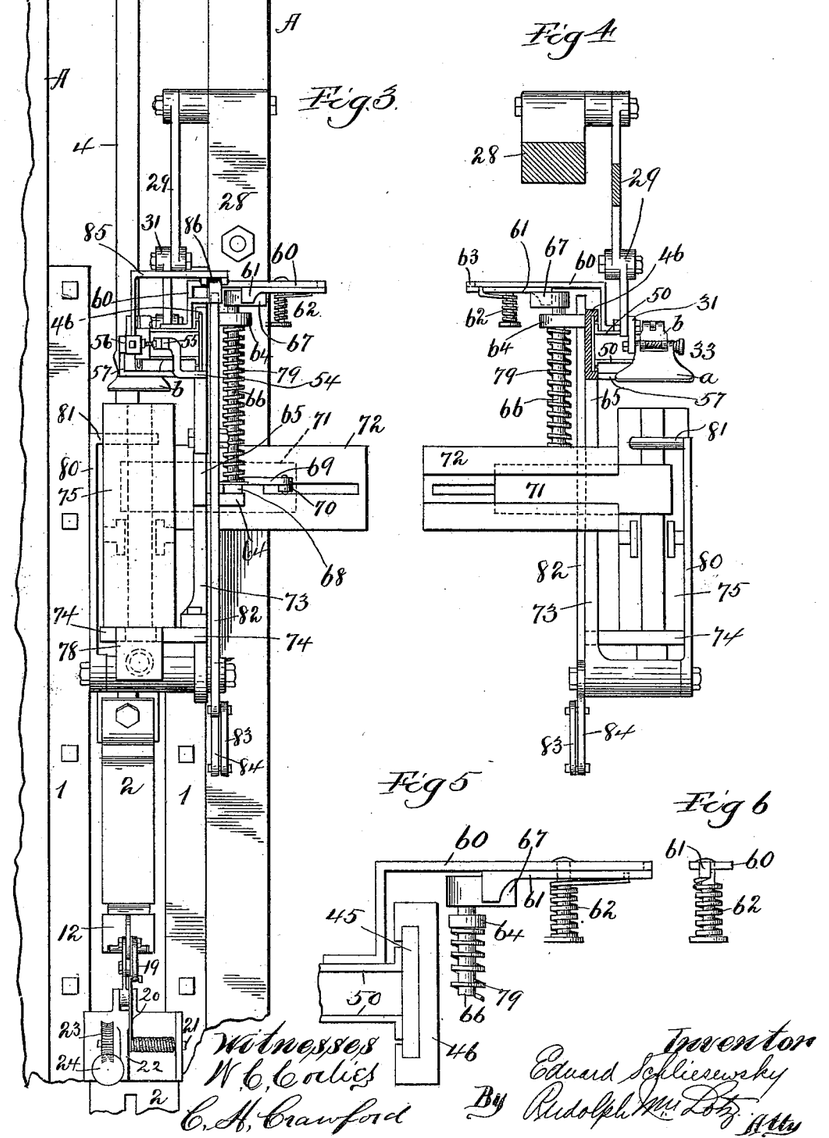
Fig. 3 is a front elevation of the machine.
Fig. 4 is a detail sectional view taken on the line 4 4 of Fig. 2 and showing the bunching device and shavings-carrier in elevation.
Fig. 5 is a detail view in elevation, on an enlarged scale, showing some of the parts shown in Figs. 3 and 4.
Fig. 6 is a detail view of a spring-finger shown in Fig. 5.
Figure 7:
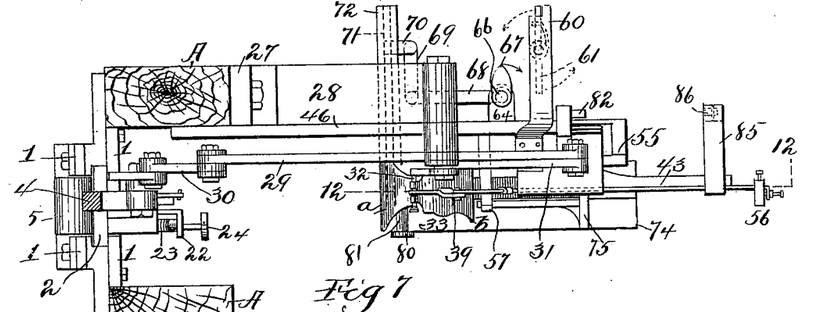
Fig. 7 is a horizontal section of the machine, taken on the line 7 7 of Fig. 2.
Figures 8, 9, 10:
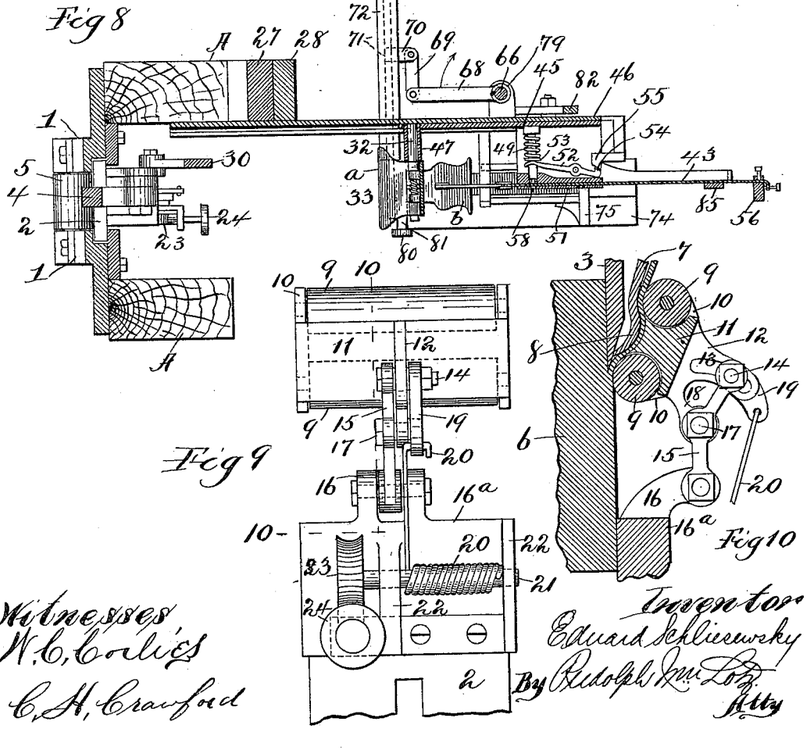
Fig. 8 is a horizontal section taken on the line 8 8 of Fig. 2.
Fig. 9 is a detail view in elevation of the device for straightening the shavings.
Fig. 10 is a sectional view taken on the line 10 10 of Fig. 9.
Figure 11:
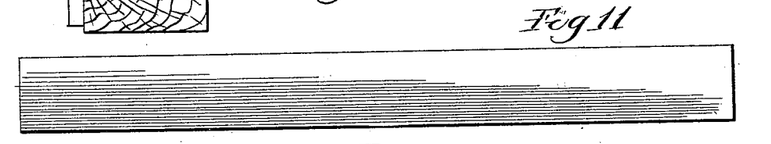
Fig. 11 is a view in elevation of a shaving.
Figures 12, 13, 14:
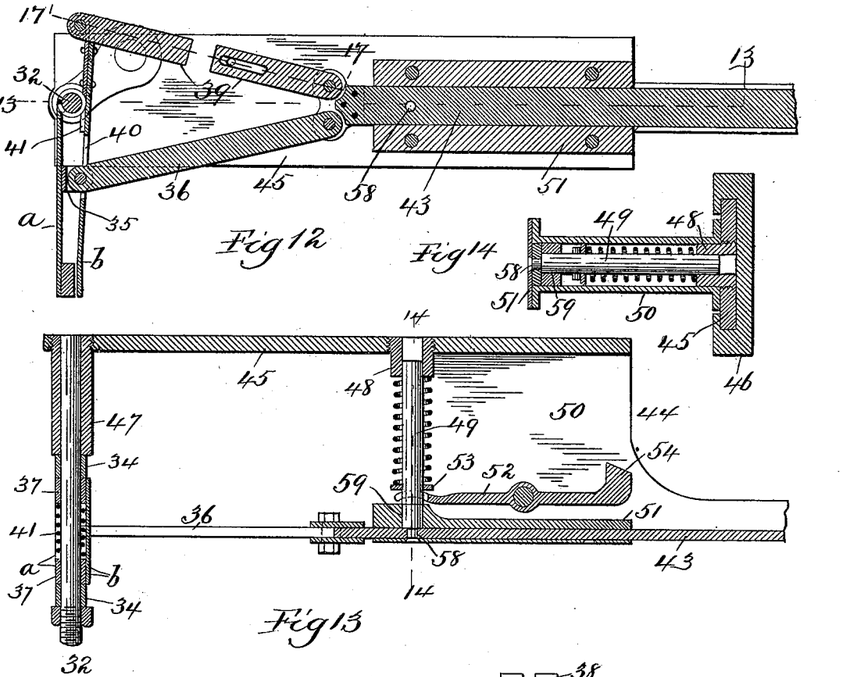
Fig. 12 is a sectional view taken on the line 12 12 of Fig. 7.
Fig. 13 is a sectional view taken on the line 13 13 of Fig. 12.
Fig. 14 is a detail sectional view on the line 14 14 of Fig. 13.
Figure 15:
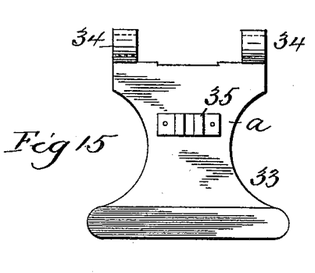
Fig. 15 is a detail view in elevation of one of the jaws of the shavings-carrier.
Figure 16:
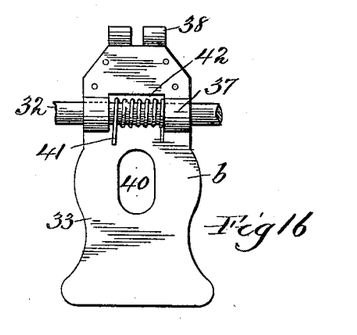
Fig. 16 is a detail view in elevation of the other jaw of the shavings-carrier and other parts of same.

The links 36 and 39 are pivoted at their other ends to the end of a rod 43, slidingly mounted in a frame 44, consisting of a bar 45, mounted in a guide 46, secured to the upright A and casting 27 and extending horizontally outward from the same, said bar carrying a sleeve-bearing 47, in which the shaft 32 is mounted, and a bearing 48, in which a spring-actuated bolt or pin 49 is mounted and to which two parallel plates 50 are secured, upon the outer ends of which the guide 51, in which the rod 43 moves, is mounted and between which a trip-lever 52, which engages a collar 53 on said pin 49, is pivoted. Said collar 53 is rigidly mounted upon said pin 49 and is adapted to be engaged by the bifurcated end of said trip-lever 52 to press said pin 49 against the action of said spring. Said trip-lever 52 is provided on its other end with an inclined face 54, which is adapted to be engaged by a projection 55 on the guide 46 to turn said lever 52 on its pivot, and thus operate said pin 49, whose office will be hereinafter described. Said rod 43 is provided at its other end with an adjustable collar 56, which is adapted to be engaged by a projection 57 on said guide 46 to limit the movement of said rod toward the standards A. It will be obvious that when said collar 56 is engaged by said projection 57 a further movement of the bar 45 will cause the jaws $a$ and $b$ to close, thus grasping the shaving between them, and to hold said jaws in this position to cause them to carry the shaving to the bunching device I have provided an opening 58 in the rod 43, which is adapted to be brought into alinement with the opening 59 in the guide 51 when said bar reaches the forward limit of its movement, thus allowing said pin 49 to spring into the same and lock said rod against movement with relation to the guide 51, thus locking said jaws $a$ and $b$ in their closed positions until said finger is withdrawn from said opening 58 by said lever 52, when the face 54 thereof is engaged by said projection 55 as said bar 45 reaches the rearward limit of its movement. As soon as said pin 49 is withdrawn from said opening 58 the spring 41 will force said jaws apart, thus releasing the shaving and forcing said rod 43 to the forward limit of its movement with relation to said guide 51. Carried by said uppermost plate 50 is an arm 60, which extends over said guide 46 and upon which a trip-lever 61 is pivoted, which is adapted to be turned in one direction against the action of a spring 62 and which is held rigid against turning in the other direction by means of a lug 63 thereon, which fits within a recess in said arm 60 and abuts against the same, it being normally held in contact with said arm 60 by said spring 62. Pivotally mounted in lugs 64 on said guide 46 and on a downwardly-extending arm 65 is a shaft 66, which carries an arm 67 at its upper end, which is adapted to be engaged by said trip-lever 61, and which carries an arm 68 at its lower end, which is connected by means of a link 69 with the arm 70 of a plate 71, slidingly mounted in a guide 72, carried by a downwardly-extending arm 73. Said arm 73 carries a slotted plate 74, parallel with and below said guide 46, upon which the shavings are bunched. A plate 75 is mounted upon said plate 74 and is provided with a guide-lug 76, passing through the slot in said plate 74, by means of which it is guided. A spring 77 is interposed between said lug 76 and a lug 78, extending downwardly from the rear end of said plate 74, which is adapted to move said plate 75 toward the guide 72. The jaws $a$ and $b$ are adapted to deliver the shaving upon said plate 74 and in the path of said plate 75 and are adapted to be held between the latter and said plate 71, which is adapted normally to project in the path of said plate 74, being held in such position by means of a spring 79, coiled around and engaging said shaft 66. A lever 80, carried by a shaft pivotally mounted in the lower end of said arm 73 and provided at its upper end with a finger 81, is adapted to force said plate 75 and the shavings in front of same back against the action of said spring 77 to make room for the next shaving delivered to said bunching device and is adapted to follow and force each shaving upon the bunching device. The said lever 80 is actuated by a lever 82, pivotally mounted between its ends upon the lower end of the arm 65 and which is connected by means of a link 83 with a downwardly-extending arm 84 on the opposite end of the shaft upon which said lever 80 is mounted, said lever 82 being adapted to be engaged by devices carried by the rearwardly-extending portion of said lowermost plate 50. These devices consist of an arm 85, extending upwardly and over said guide 46 and upon which a plate 86 is pivotally mounted, which is rigid with said arm 85 in one direction and is revoluble in the other direction, said plate depending by gravity and provided with a flange at its upper end, which is adapted to engage said arm 85. The operation of these parts is as follows:

In the position shown in Fig. 1 the jaws have just grasped the shaving and move toward the bunching device. During the first part of the movement of the jaws the plate 86 engages the upper end of the arm 82 and forces said arm rearwardly, thus turning said lever 80 so that its finger 81 follows the shaving, and when same is released by the jaws it is caught by said finger and forced against the foremost shaving of said bunch already in said bunching device and also forces the entire bunch back against the action of the spring 77. Just prior to this movement the arm 67 of shaft 66 has been engaged by the plate 61 and turned so that the plate 71 moves out of the path of the bunch of shavings just at the moment that the next shaving is delivered and the lever 80 has taken the position shown in Fig. 2 and forced the entire bunch, together with the last shaving delivered, back out of the path of said plate 71, which immediately springs back into place simultaneously with the release of said lever 82 from engagement with said plate 86. The spring 77 would immediately force the bunch of shavings against said plate 71, and this movement would throw the lever 80 back to the position shown in Fig. 1. Upon the return stroke of the jaws the plate 86 would pass over without engaging said lever 82, and the plate 61 would likewise be turned on its pivot when coming into contact with the arm 67, so that the latter would remain at rest.

It will be obvious that the knife 3 must retain its position at all times—that is, that the cutting edge must always cut the shaving at the same part of the stroke of the plunger 2. As this knife must be ground at intervals and thus shortened, I have provided means for adjusting the same, which consist of a wedge-shaped slot 87 in said knife, in which a wedge-shaped key 88 is adapted to fit, which is provided with openings through which the screws 89 are adapted to pass into screwthreaded openings in the plunger 2. The said key 88 is shorter than the slot 87, so that it can be secured at any desired point in the slot. In this manner said knife 3 can obviously be moved downward in accordance with the reduced length thereof after grinding.

Figures 21, 22:
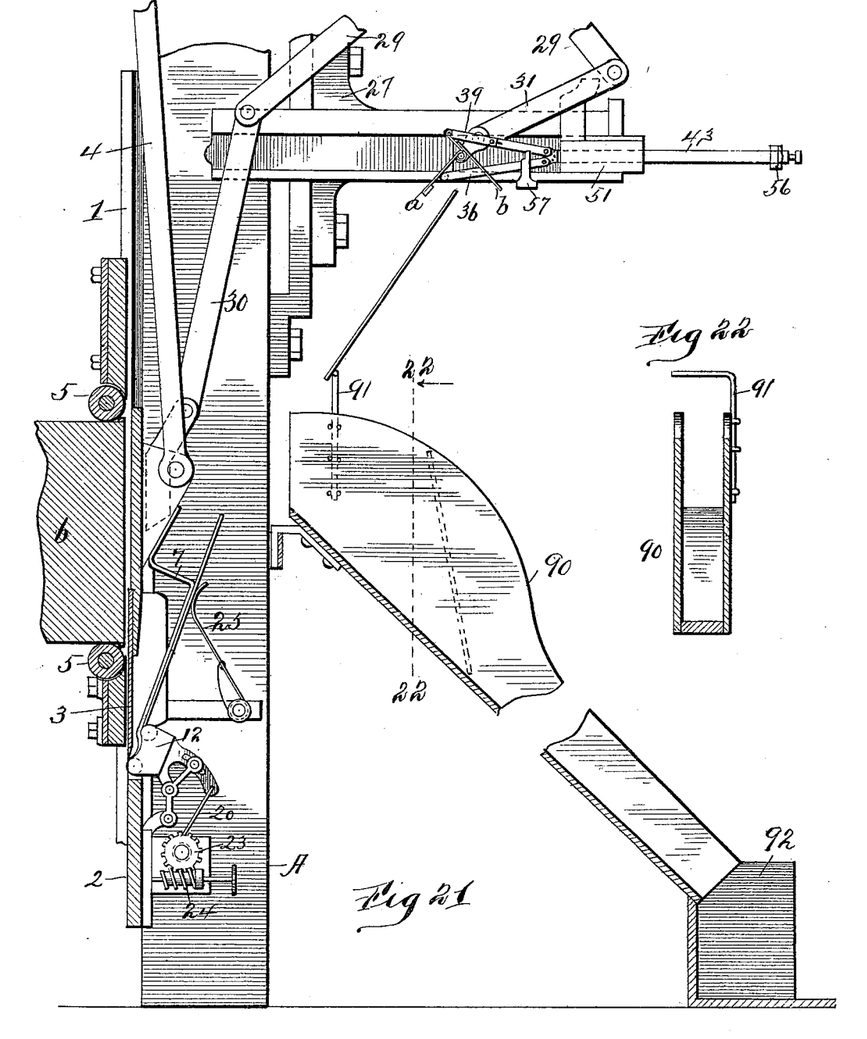
Fig. 21 is a vertical section of a modified form of construction of my machine in which the bunching device is omitted and a chute substituted.
Fig. 22 is a sectional view on the line 22 22 of Fig. 21.

In Fig. 21 I have shown a modified form of construction of bunching device which is simpler and which operates more satisfactorily than the one above described. This consists of a chute 90, situated below and in vertical alinement with said shavings-carrying devices, and therefore in the path of the shaving. The shaving is adapted to strike an upwardly-extending arm 91 on said trough prior to its release from said jaws, as shown in Fig. 21, and thus when released turn upon said arm 91 as a fulcrum and fall into the chute, from which it is delivered into a receptacle or box 92 at the lower end of said chute 90 and lies flat in the same, each shaving as delivered lying flat upon the prior shaving, and thus forming a bunch. An opening in one side of the box 92 permits the insertion of the hand for the purpose of removing the bunch at certain intervals.

I claim as my invention—

1. In a machine of the kind specified, devices for cutting and straightening shavings, comprising a knife, a plate adjacent said knife bearing against the same at its lower end, a corrugation in the lower end of said plate adapted to receive the shoulder formed by the beveled edge of said knife, and rollers adapted to bear against said plate and receive said corrugation between them, whereby a shaving will be forced over said corrugation and straightened.

2. In a machine of the kind specified, devices for cutting and straightening shavings, comprising a knife, a plate adjacent said knife bearing against the same at its lower end, a corrugation in the lower end of said plate adapted to receive the shoulder formed by the beveled edge of said knife, and rollers adapted to bear against said plate and receive said corrugation between them, whereby a shaving will be forced over said corrugation and straightened, said rollers being mounted in a frame pivotally mounted upon said plunger and actuated by a spring to bring pressure upon the shaving.

3. In a machine of the kind specified, a knife for cutting shavings, devices for receiving said shavings to straighten the same, devices for holding said shavings to deliver same to transporting devices, and transporting devices for receiving said shavings and carrying same to bunching devices, comprising a pair of horizontally-reciprocating jaws adapted to grasp said shavings and carry same to bunching devices and there release the same.

4. In a machine of the kind specified, the combination with devices for cutting and straightening shavings, of devices for receiving said shavings and carrying the same to bunching devices, comprising horizontally-reciprocating jaws carried by a frame mounted in guides on the frame of the machine and operated from a moving part of the same, said jaws being adapted to grasp the shavings at one end of their stroke and release the same at the other end.

5. In a machine of the kind specified, devices for straightening shavings, comprising a plate provided with a convex projection over which the shaving passes, and a pair of rollers adapted to bear upon the other face of the shaving and bend same over said convex projection, said rollers being mounted in a frame pivoted upon the plunger and normally held in engagement with the shaving by means of a spring.

6. In a machine of the kind specified, devices for straightening shavings, comprising a plate provided with a convex projection over which the shaving passes, and a pair of rollers adapted to bear upon the other face of the shaving and bend same over said convex projection, said rollers being mounted in a frame pivoted upon the plunger and normally held in engagement with the shaving by means of a spring, and means for adjusting the tension of said spring according to the thickness of the shaving.

7. In a machine of the kind specified, a shavings-carrier comprising a horizontally-reciprocating frame movable in guides on the frame of the machine, guides in said frame, a rod movable in said guides, a shaft carried by said frame, a pair of jaws pivotally mounted upon said shaft and adapted to be held normally apart by means of a spring, links connecting each of said jaws with said rod, a collar on said rod adapted to be engaged by a projection on said guides to limit its movement in one direction, an opening in said rod adapted to receive the end of a spring-actuated pin to lock said rod at the rearward limit of its movement with relation to said frame, a lever adapted to be engaged and turned on its pivot by a projection on said guides adapted to move said pin against the action of said spring to release said rod, and connection between said shaft and a moving part of the machine for moving said frame, and closing said jaws.

8. In a machine of the kind specified, a shavings-carrier comprising a horizontally-reciprocating frame movable in guides on the frame of the machine, guides in said frame, a rod movable in said guides, a shaft carried by said frame, a pair of jaws pivotally mounted upon said shaft and adapted to be held normally apart by means of a spring, links connecting each of said jaws with said rod, a collar on said rod adapted to be engaged by a projection on said guides when said frame is adjacent the forward limit of its movement to force said rod to the rearward limit of its motion with relation to said frame, an opening in said rod adapted to receive a spring-actuated pin when said rod reaches the rearward limit of its movement with relation to said frame to lock it in such position, and close and lock said jaws, a lever pivotally mounted in said frame and adapted to engage said pin to move it against the action of its spring, a projection on said guides adapted to engage said lever when said frame reaches the rearward limit of its movement to withdraw said pin and release said rod to permit the jaws to open, and connection between said shaft carrying said jaws and a moving part of the machine for moving said frame.

9. In a machine of the kind specified, the combination with a reciprocating knife adapted to cut a shaving, and devices on said knife adapted to receive and hold said shaving, of reciprocating jaws adapted to move into the path of said shaving and to close and grasp the same to remove it from said holding devices and transport said shaving to the rearward limit of movement of said jaws and there release it.

10. In a machine of the kind specified, the combination with a vertically-reciprocating knife adapted to cut a shaving, and devices on said knife adapted to receive and hold said shaving, of a horizontally-reciprocating carrier, carrying-jaws adapted to move into the path of said shaving and there close to grasp the same and carry it to the opposite limit of movement of said jaws and there open to release it.

11. In a machine of the kind specified, a vertically-reciprocating plunger carrying a knife, devices mounted upon said plunger for receiving the shaving as it is cut by the knife and straightening the same, devices for holding said shaving and carrying same upwardly with the upward movement of the plunger, a reciprocating carrier mounted in guides on the frame of said machine for receiving said shavings when said plunger reaches the upward limit of its movement and delivering same to a suitable receptacle, and connection between said plunger and said carrier, comprising a bell-crank lever pivotally mounted at the meeting point of its arms upon said machine and connected at its one end with said carrier by means of a link and connected at its other to the plunger by means of a link.

In testimony whereof I affix my signature in presence of two witnesses.

EDUARD SCHLIESEWSKY.

Witnesses:
RUDOLPH WM. LOTZ,
E. J. BOILEAU.